United States Patent [19]
Spillman, Jr.

[11] Patent Number: 5,459,397
[45] Date of Patent: Oct. 17, 1995

[54] SPEED SENSOR FOR ROTATABLE SHAFT USING SHAFT MOUNTED ANTENNA

[76] Inventor: William B. Spillman, Jr., R.D. 1, Box 1569 Guinea Rd., Charlotte, Vt. 05445

[21] Appl. No.: 979,744

[22] Filed: Nov. 23, 1992

[51] Int. Cl.⁶ ..................................................... G01P 3/42
[52] U.S. Cl. ......................... 324/160; 324/166; 324/176; 340/671; 340/870.18
[58] Field of Search ............................... 324/160, 207.22, 324/207.25, 166, 176, 635, 644, 173, 163, 207.17; 340/671, 870.30–870.32, 870.37, 870.18, 572, 551, 552

[56] References Cited

U.S. PATENT DOCUMENTS

| | | | |
|---|---|---|---|
| 3,719,935 | 3/1973 | Chaney et al. | 340/206 |
| 3,758,845 | 9/1973 | MacKelvie et al. | 323/51 |
| 3,876,998 | 4/1975 | Richter et al. | 340/189 |
| 4,059,015 | 11/1977 | Satori | 340/870.31 |
| 4,070,621 | 1/1978 | Bassen et al. | 324/133 X |
| 4,090,176 | 5/1978 | Rodler | 340/870.18 |
| 4,201,083 | 5/1980 | Kurita et al. | 324/160 |
| 4,223,300 | 9/1980 | Wiklund | 340/196 |
| 4,238,733 | 12/1980 | Freeman | 324/158 MG X |
| 4,743,786 | 5/1988 | Ichikawa et al. | 310/111 |
| 4,874,245 | 10/1989 | Spillman, Jr. et al. | 250/225 |
| 4,924,161 | 5/1990 | Ueki et al. | 324/173 |
| 5,140,696 | 8/1992 | Fox | 455/41 |
| 5,150,115 | 9/1992 | deJong et al. | 340/870.31 |

Primary Examiner—Sandra L. O'Shea
Assistant Examiner—J. Patidar
Attorney, Agent, or Firm—Leonard L. Lewis; William E. Zitelli

[57] ABSTRACT

Apparatus and method for detecting rotation of a shaft include a first antenna for transmitting electromagnetic energy into the shaft, a second antenna disposed for rotation with the shaft for modulating electromagnetic energy passing through the shaft in relation to the shaft rotational speed, and a detector for detecting the modulated electromagnetic energy that passes through the shaft.

21 Claims, 2 Drawing Sheets

SPEED SENSOR FOR ROTATABLE SHAFT USING SHAFT MOUNTED ANTENNA

BACKGROUND OF THE INVENTION

The invention relates to sensors for rotatable shafts. More specifically, the invention relates to sensors that can advantageously be used for speed and torque measurements for rotatable shafts.

Sensing operational characteristics of rotatable shafts such as speed and torque has many applications. For example, sensors are often required to determine engine drive shaft rotation speeds. Optical rotation sensors are known and have the advantage of being less sensitive to electromagnetic interference, noise and harsh environmental conditions such as high temperature, pressure and vibration. Unfortunately, known optical sensors are somewhat limited in use because other environmental conditions such as lubricating fluids and combustion by-products can deteriorate the effectiveness of optical sensors that utilize light near the visible spectrum.

In addition, it is expected that next generation aircraft will make substantial use of composite materials, such as carbon-carbon composites, for drive shafts and the like. Therefore, the need exists for a rotation sensor that can be easily used with shafts made of such composite type materials with performance that is not degraded by the aforementioned environmental conditions.

SUMMARY OF THE INVENTION

In response to this need, the present invention contemplates a sensor for a rotatable shaft that, in a preferred embodiment, comprises a source of electromagnetic energy transmittable through a portion of the shaft, a modulator that modulates the amount of electromagnetic energy that passes through the shaft as a function of the shaft rotation, and a detector for detecting the modulated electromagnetic energy that passes through the shaft portion.

The invention further contemplates methods of using such a preferred apparatus, as well as a preferred method for detecting rotation of a shaft comprising the steps of transmitting electromagnetic energy into the shaft, detecting electromagnetic energy that exits the shaft, and modulating the amount of electromagnetic energy that exits the shaft as a function of rotation of the shaft.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION AND PREFERRED EMBODIMENTS

Figure 1:
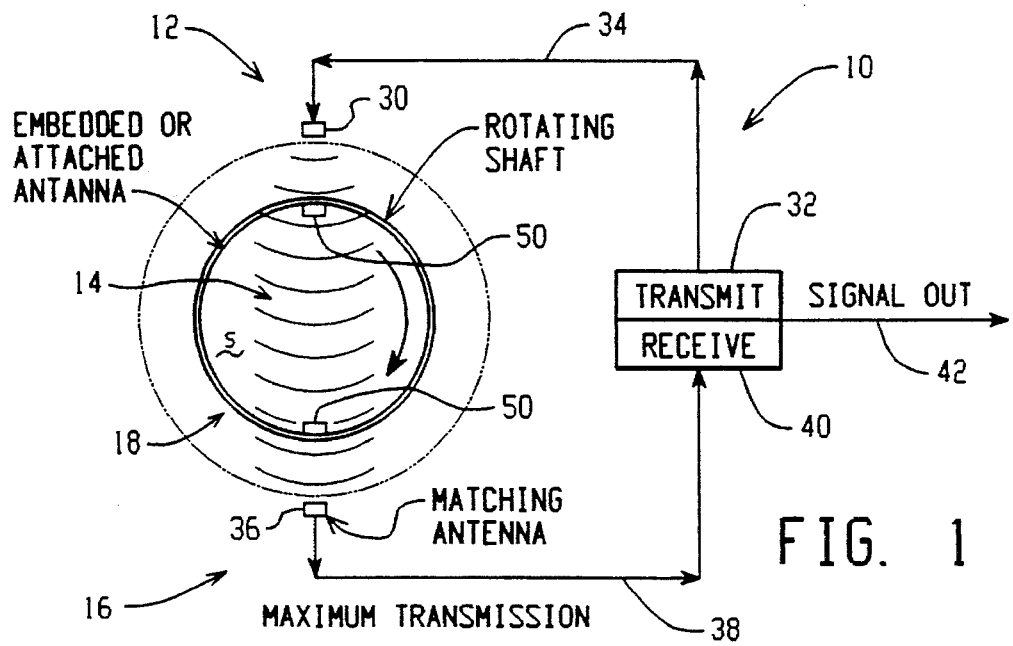
FIG. 1 is a simplified schematic of a rotation sensor in accordance with the present invention as used with a rotatable shaft.

With reference to the drawings, the present invention contemplates a rotation sensor for a shaft, such as, for example, an engine drive shaft speed sensor. However, the invention can be used advantageously with any rotatable shaft made of materials suitable for use with the invention to determine different rotation characteristics such as, for example, speed, torque and degree of rotation. For clarity and ease of explanation the invention is illustrated in the drawings in a simplified manner, it being understood by those skilled in the art that the advantages and benefits of the invention can be realized in many different ways depending on the particular application with which the invention will be used.

The rotation sensor 10 includes a source of electromagnetic radiation 12 arranged to transmit electromagnetic energy (represented by the lines 14) into the rotatable shaft S. The sensor 10 further includes a detector 16 that receives electromagnetic energy exiting the shaft. In addition, the sensor 10 includes a modulator 18 preferably positioned inside the shaft near or at the shaft axis of rotation, 1.

The source 12 is preferably realized in the simple form of a dipole antenna 30 connected to an energy source 32 such as a radio frequency generator by a coaxial cable 34. The particular operating frequency or wavelength selected forms no particular part of the present invention aside from the preferred feature that the shaft S be substantially transparent to the electromagnetic energy emitted from the source 12. Therefore, the invention contemplates that many different frequencies or wavelengths may be used such as radio waves, microwaves and so on. In the preferred embodiment, a particularly useful aspect of the invention is that electromagnetic energy near the visible spectrum need not be used. This improves the effectiveness of the invention in applications where fluids or combustion by-products and the like limit the use of visible or near visible light. In a preferred embodiment, the shaft S may be made from carbon composite materials such as graphite epoxy, so that electromagnetic energy with a frequency of 100 kilohertz would be suitable.

On another side of the rotatable shaft S is the detector 16. The detector 16 preferably is disposed diametrically opposite the source 12 such that the electromagnetic energy 14 radiates generally through the center of the shaft towards the detector 16. The detector 16 is also preferably a simple dipole antenna 36 connected by another coaxial cable 38 to a signal processor 40 such as a radio frequency transducer. In many applications, the antennas 30,36 will be substantially identical. The signal processor 40 can be realized in the form of a radio receiver that produces an output signal 42 that preferably corresponds to the intensity of electromagnetic energy incident on the receiving antenna 36. The output signal 42, therefore, could be for example, a current or voltage signal having a frequency or amplitude modulation that varies in relation to rotation or rotational position of the shaft S.

Figure 3:
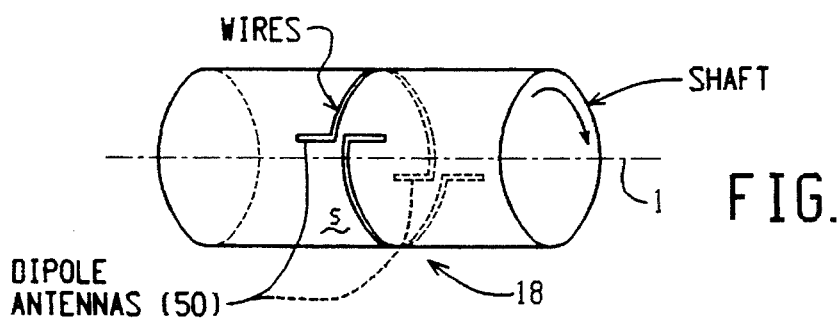
FIG. 3 is a simplified perspective of the shaft and modulator shown in FIGS. 1 and 2.

The modulator 18 is realized in the form of a resonant circuit including a pair of dipole antennas 50, similar to the source and detector antennas 30,36. The modulator resonant circuit 18 may include an energy storage device such as a capacitor in order to tune the modulator dipole antennas 50 to be resonant at the frequency of the radiated energy. The modulator can be embedded in all or part of the shaft composite material, or attached to the outer periphery of the shaft, as best illustrated in FIG. 3.

Figure 2:
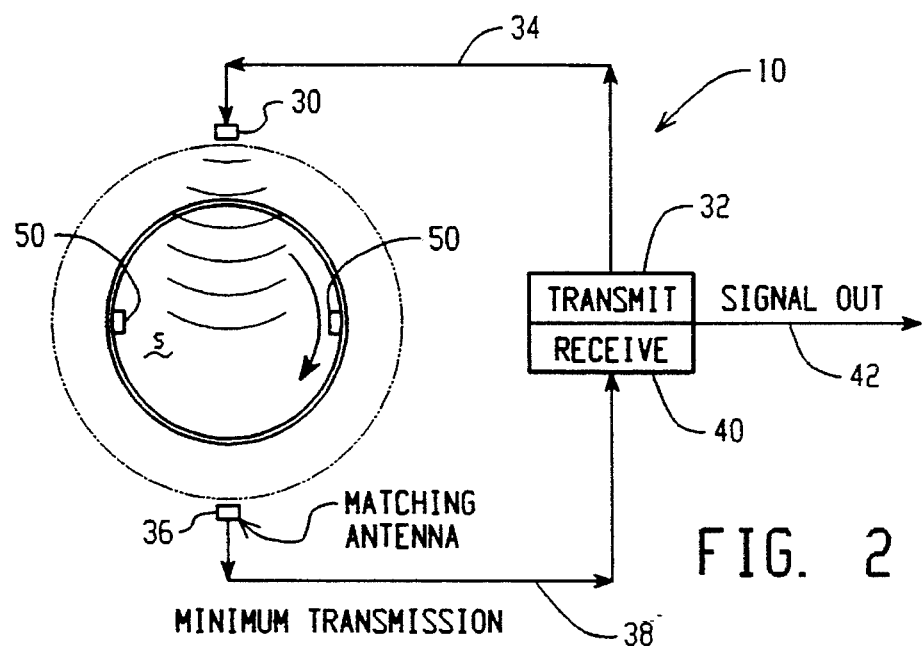
FIG. 2 is a view similar to FIG. 1 but with the shaft rotated 90 degrees.

In operation, the modulator 18 rotates with the shaft S. This causes the angular orientation of the antennas 50 to change with respect to the source and detector antennas 30,36. When the modulator 18 is aligned in the same plane as the source and detector antennas, maximum transmission of electromagnetic energy from the source to the detector occurs (as in FIG. 1). However, as illustrated in FIG. 2, when the shaft rotates to a position such that the modulator 18 is oriented transverse the plane of transmission, the modulator resonant circuit absorbs the electromagnetic energy resulting in minimal transmission of energy to the detector 36. For angular positions other than those shown in FIGS. 1 and 2, proportionate amounts of energy are received by the detector 16. For a shaft rotating at a constant speed, for example, the detector 16 output 42 may be a constant frequency almost sinusoidal waveform. The frequency will vary with the speed of rotation. However, those skilled in the art will readily understand that the intensity of the radiation received by the detector is also an indication of the angular rotation of the shaft. Therefore, if the source intensity is normalized, the invention can also be used as an angular displacement transducer and/or a torque transducing device (the latter being realized, for example, by using two apparatus 10 at different positions along the shaft axis to detect shaft twist). Therefore, the terms "rotation" or "rotatable" as used herein should be construed in its broadest sense and not limited to the concept of a spinning shaft, but is intended to more broadly relate to angular rotation or displacement of the shaft.

Figure 4:
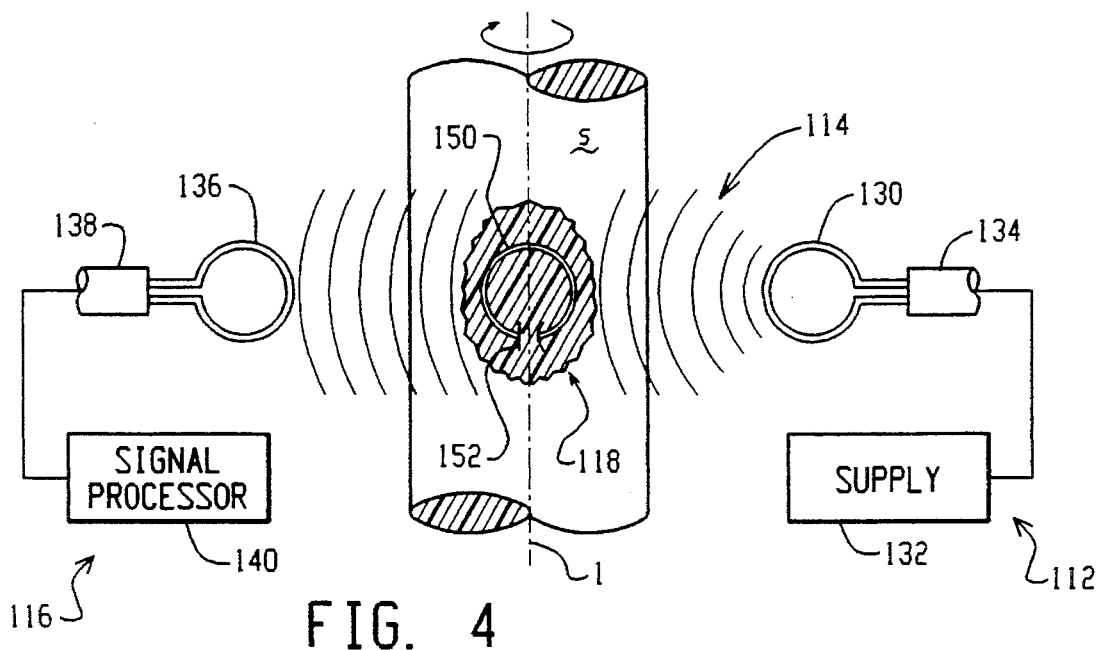
FIG. 4 is a simplified schematic of an alternative embodiment of a rotation sensor according to the present invention.
Figure 5:
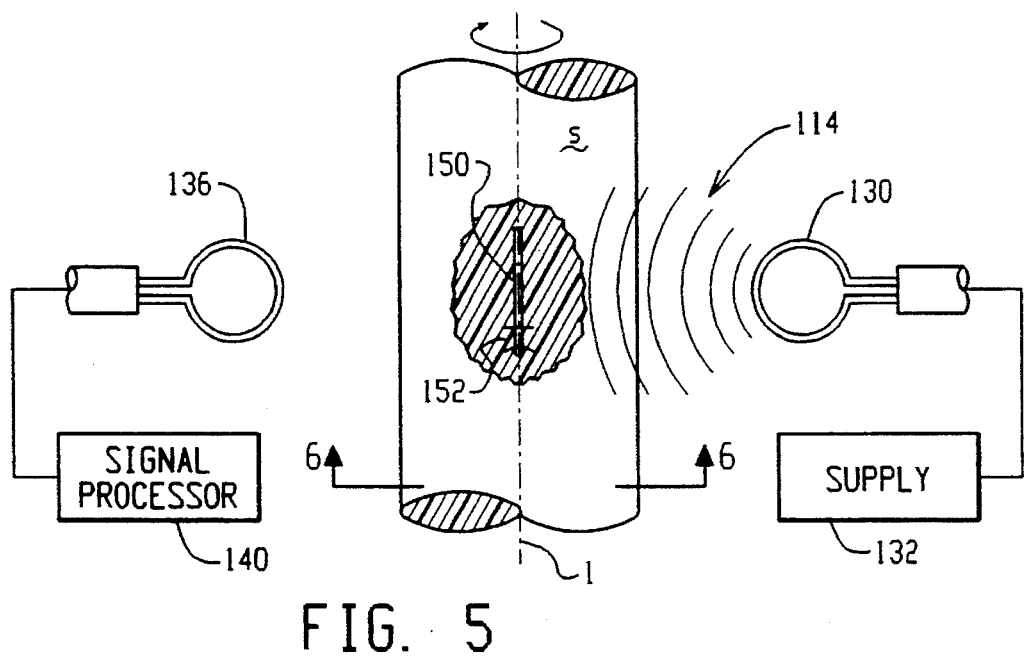
FIG. 5 is a view similar to FIG. 4 with the shaft rotated 90°.
Figure 6:
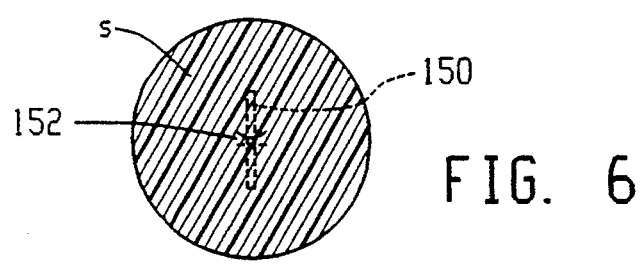
FIG. 6 is a simplified view in transverse section of the shaft and modulator shown in FIGS. 4 & 5.

An alternative embodiment is shown in FIGS. 4–6. In this embodiment, loop antennas are used in place of the dipole antennas of FIGS.1–3. A radiation source 112 includes a loop antenna 130 connected to an energy source 132 by a coaxial cable 134. The energy source 132 may be the same as used for the energy source 32 in the preferred embodiment. A detector 116 includes a second loop antenna 136 connected to a signal processing circuit 140 (such as, for example, a radio receiver) by a coaxial cable 138. A resonant modulator 118 includes a third loop antenna 150 and a resonant tuning capacitor 152. As illustrated in FIGS. 4 & 5, the amount of electromagnetic energy 114 transmitted through the shaft is a function of rotational position of the shaft, similar to the operation of the preferred embodiment. FIG. 6 shows a preferred arrangement of having the modulator loop antenna embedded in the shaft on the centerline axis of rotation 1.

While the invention has been described with respect to a specific embodiment thereof, modifications will be apparent to those skilled in the art. For example, the modulator need not be a resonant antenna circuit, but rather any device that will suitably block and pass the electromagnetic energy in relation to the rotation of the shaft. The modulator device used, however, preferably should not affect the structural integrity of the shaft. Alternatively, the detector could be used to detect energy reflected from within the shaft, as distinguished from detecting energy that transmits completely through the shaft.

While the invention has been shown and described with respect to specific embodiments thereof using detailed schematics and words, this is for the purpose of illustration rather than limitation, and other variations and modifications of the specific embodiments herein shown and described will be apparent to those skilled in the art within the intended spirit and scope of the invention as set forth in the appended claims.

I claim:

1. A speed sensor for a rotatable shaft comprising antenna means for transmitting electromagnetic energy into the shaft, means for detecting at least a portion of electromagnetic energy that exits the shaft, and means disposed for rotation with the shaft for modulating said electromagnetic energy in relation to the shaft rotation speed.

2. The speed sensor of claim 1 wherein said shaft comprises composite material that is transparent to said electromagnetic energy.

3. The speed sensor of claim 1 wherein said shaft consists of carbon composite material.

4. The speed sensor of claim 3 wherein said transmitting means comprises a transmitting antenna that radiates electromagnetic energy at a predetermined frequency, and said detecting means comprises a receiver antenna that is tuned to said frequency.

5. The speed sensor of claim 4 wherein said modulating means comprises a resonating antenna tuned to said frequency and mounted in the shaft for rotation therewith, said resonating antenna alternately absorbing and passing said radiated energy as a function of rotation of the shaft.

6. The speed sensor of claim 5 wherein said transmitting antenna and said receiver antenna are aligned in a common plane on radially opposite sides of the shaft with respect to the shaft longitudinal axis, said resonating antenna absorbing said radiated energy when oriented in a plane transverse said common plane and passing said radiated energy when oriented in said common plane.

7. The speed sensor of claim 6 wherein said antennas are loop antennas.

8. The speed sensor of claim 7 wherein said resonating antenna comprises a loop antenna in combination with a capacitor to form a resonant energy storage circuit.

9. The speed sensor of claim 8 wherein said radiated energy is in the radio frequency band.

10. The speed sensor of claim 8 wherein said radiated energy is in the microwave frequency band.

11. In combination, a rotatable shaft and a rotation sensor therefor, the sensor comprising an antenna for transmitting electromagnetic energy through a portion of the shaft, a modulator disposed for rotation with the shaft and that modulates the electromagnetic energy in relation to the shaft rotation, and a detector for detecting the modulated electromagnetic energy.

12. The combination of claim 11 wherein the shaft consists of composite material that is substantially transparent to the radiated electromagnetic energy.

13. The combination of claim 12 wherein the antenna, detector and modulator comprise respective dipole antennas tuned to a predetermined frequency.

14. The combination of claim 13 wherein the modulator further comprises a tuned resonant circuit including the modulator antenna, wherein the resonant circuit absorbs the radiated electromagnetic energy as a function of the shaft rotation.

15. The combination of claim 14 wherein the electromagnetic energy passing through the shaft is modulated at a frequency that corresponds to the shaft speed of rotation.

16. The combination of claim 15 wherein the modulator is mounted inside the shaft for rotation therewith.

17. A method for detecting rotation of a shaft comprising the following steps:

a. transmitting electromagnetic energy from an antenna into the shaft;

b. detecting electromagnetic energy that exits the shaft; and c. modulating the amount of electromagnetic energy that exits the shaft in relation to rotation of the shaft.

18. The method of claim 17 wherein the step of modulating the electromagnetic energy is performed in relation to the speed of rotation of the shaft.

19. The method of claim 18 as used to determine the speed of rotation of a shaft made of composite material that is substantially transparent to the electromagnetic energy.

20. The method of claim 19 wherein the electromagnetic energy has a frequency in the radio or microwave band.

21. A sensor for a rotatable shaft comprising a transmitting antenna that radiates electromagnetic energy at a predetermined frequency into the shaft, a receiver antenna for detecting the electromagnetic energy that exits the shaft, and a resonating antenna tuned to said frequency and disposed for rotation with the shaft; the resonating antenna modulating the electromagnetic energy in relation to shaft rotation.

* * * * *